United States Patent
Colby

(10) Patent No.: US 10,900,797 B2
(45) Date of Patent: *Jan. 26, 2021

(54) LOAD-BASED MAPPING

(71) Applicant: Michael K. Colby, Eagle, ID (US)

(72) Inventor: Michael K. Colby, Eagle, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,325

(22) Filed: Jan. 1, 2020

(65) Prior Publication Data

US 2020/0132487 A1    Apr. 30, 2020

Related U.S. Application Data

(63) Continuation of application No. 15/588,097, filed on May 5, 2017, now Pat. No. 10,527,441.

(60) Provisional application No. 62/333,002, filed on May 6, 2016.

(51) Int. Cl.
*G01C 21/34* (2006.01)
*G01C 21/36* (2006.01)

(52) U.S. Cl.
CPC ..... *G01C 21/3484* (2013.01); *G01C 21/3461* (2013.01); *G01C 21/3492* (2013.01); *G01C 21/3641* (2013.01)

(58) Field of Classification Search
None
See application file for complete search history.

(56) References Cited

U.S. PATENT DOCUMENTS

| | | | |
|---|---|---|---|
| 9,384,661 B1 | 7/2016 | Deluca et al. | |
| 10,527,441 B2 | 1/2020 | Colby | |
| 2010/0106603 A1 | 4/2010 | Dey et al. | |
| 2015/0260531 A1 | 9/2015 | Ehsani et al. | |
| 2016/0039426 A1 | 2/2016 | Ricci | |
| 2017/0030726 A1 | 2/2017 | French et al. | |
| 2019/0049261 A1 | 2/2019 | Colby | |

OTHER PUBLICATIONS

"International Search Report and Written Opinion", PCT Application No. PCT/US2017/031337, dated Jul. 26, 2017, 6 pages.
"Non-Final Office Action", U.S. Appl. No. 15/588,097, dated Jan. 25, 2019, 10 pages.
"Notice of Allowance", U.S. Appl. No. 15/588,097, dated Sep. 6, 2019, 9 Pages.
"Preliminary Report on Patentability", PCT Application No. PCT/US2017/031337, dated Nov. 15, 2018, 6 pages.

*Primary Examiner* — Peter D Nolan
*Assistant Examiner* — Demetra R Smith-Stewart

(57) ABSTRACT

This document describes techniques and apparatuses for load-based mapping. The techniques provide routes for drivers that take into account a cognitive, emotional, or psychological load for the routes. By so doing, a driver can receive a route from one point to another that the driver may better enjoy, feel less tired or stressed by, or take less mental effort to drive.

50 Claims, 4 Drawing Sheets

LOAD-BASED MAPPING

RELATED APPLICATIONS

This application claims priority to, and is a continuation of U.S. Utility application Ser. No. 15/588,097, filed May 5, 2017 which in turn claims priority to U.S. Provisional Application 62/333,002, filed May 6, 2016, the disclosures of which are incorporated by reference herein in their entireties.

BACKGROUND

Many conventional mapping systems provide drivers with a fastest or shortest route from one point to another. A driver asks for directions to a particular house or business, and the conventional systems indicate the fastest route, or perhaps the shortest route, taking into account current or historic traffic patterns.

SUMMARY

This document describes techniques and apparatuses for load-based mapping. The techniques provide routes for drivers that take into account a cognitive, emotional, or psychological load for the routes. By so doing, a driver can receive a route from one point to another that the driver may better enjoy, feel less tired or stressed by, or take less mental effort to drive.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Overview

Figure 1:
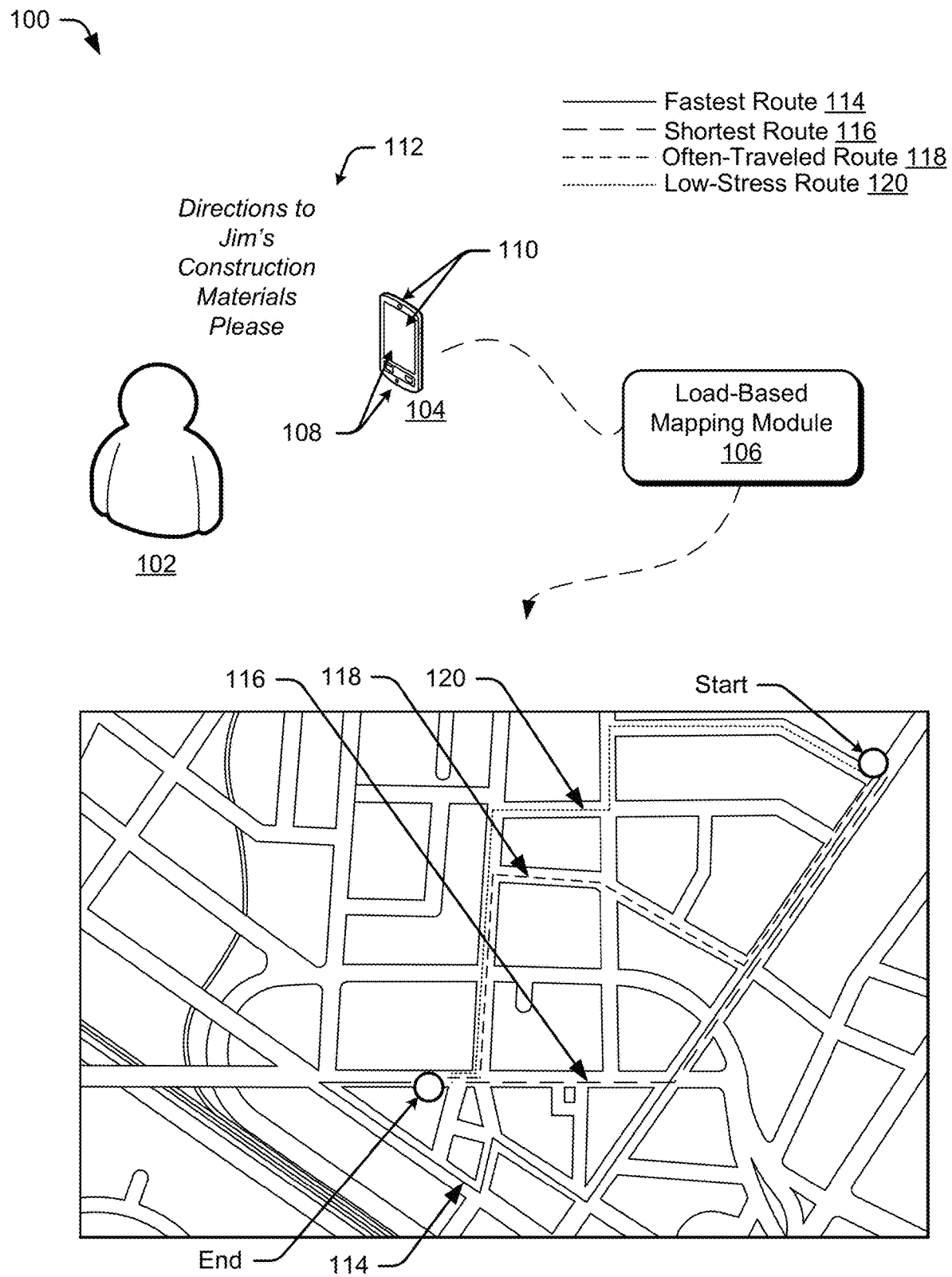
FIG. 1 illustrates an operating environment in which techniques enabling load-based mapping can be performed.

This document describes techniques and apparatuses enabling load-based mapping. Techniques for load-based mapping provide routes for drivers that take into account a cognitive, emotional, or psychological load for routes. Assume, for example, that a driver asks for directions from her house to a business 12 miles away. Conventional mapping systems find the shortest or quickest route, and provide one or both of these for the driver to select. But studies show that many tasks do not just have time cost—here the time to drive, or a resource cost (e.g., gas in your car). Instead, there is a load, a "cost", that is not simply time or resources. In contrast to conventional mapping systems, the disclosed techniques for load-based mapping consider the load of potential routes, and then provide the route or routes that are lower cost in terms of a driver's load in driving the route.

In more detail, assume that there are four routes from the driver's house to a business 12 miles away (point-to-point, not on roads), the four routes taking the following times and distances on road:

Route 1: 24 minutes, 17.3 Miles
Route 2: 26 minutes, 14.8 Miles
Route 3: 29 minutes, 15.3 Miles
Route 4: 28 minutes, 16.4 Miles Conventional mapping systems would select Route 1 or Route 2. The load-based mapping would consider also the following factors in creating or analyzing created routes:

Route 1: Predominantly Freeway, four lanes each way, rarely driven by driver, many perceived dangers (two and three-trailer semi-trucks, large loaded vehicles, fast-driving sports cars). Little if any nature.

Route 2: Small portion of route previously driven by driver, by many stops, lights, and turns. Portions having one lane with no median, no shoulder, and small to no gap to objects on sides of road. Moderate nature, but many buildings and homes.

Route 3: Large portion of route commonly driven by driver, moderate stops and lights, few turns. Two lanes predominant, some with shoulder and median, some without. Wide gap to objects on side of road. Moderate nature, some distance views, low claustrophobia conditions.

Route 4: Small portion of route commonly driven by driver, few stops and few lights, but high perceived danger due to no median, no shoulder, and many entry points from parking lots and sides roads onto large portions of route. Moderate nature, some distance views, low claustrophobia conditions.

As shown in this example, many different types of factors affect the load for a driver of a route. In some cases this is independent of personality, and in some others it is not. Further, while it may be independent of a person's history, having that person's history can aid in determining a cognitive load for routes having portions that the driver has or has not previously traveled. Thus, the techniques may decide, based on the particular driver having driven portions of route 3 over 20 times in the last six months, as well as the moderate stops, lights, and turns, and lower perceived danger, that route 3 is the best low-load route for that driver.

Example Operating Environment

FIG. 1 is an illustration of an example environment 100 in which the techniques enable load-based mapping. Environment 100 includes a driver 102, a computing device 104, a load-based mapping module 106 (mapping module 106), and four routes. The computing device 104 includes an input structure 108 and an output structure 110. Here the input structure 108 is a microphone or touch screen through which to receive a request 112 ("Directions to Jim's Construction Materials Please") for a route to an end location. The output structure 110 is one way in which to provide a route determined by the mapping module 106, such as audio or visual structures like a speaker or display. These structures can be separate from or integral with the computing device 104.

Responsive to the request 112, the mapping module 106 determines, based on one or more factors affecting a cognitive, emotional, or psychological load, a determined route from the start location to the end location. A load can includes cognitive, emotional, or psychological loads. An emotional load is one having a negative emotional effect on a person, or a positive effect has a low or even negative load.

This emotional effect is one in which a person feels a negative emotions caused by some factor, such as dirty streets and graffiti, or conversely a beautiful pasture with wildlife. Examples include nature and aesthetics as well as perceived danger as described herein. A cognitive load is one having mental effort on a driver, which may be apparent to the driver based on a perceived speed of the drive or how tiring the drive seems. Examples include new or fairly new routes, which have higher loads (prior-driven route or route portion is a low load factor) and route-based disturbances. Similarly, mental loads include those drag on a driver or force them to stay focused, such as road surroundings, lane number, and types of vehicles. There can be some overlap with each of these examples, as perceived danger for example can cause a cognitive or mental load as well. In some cases the determination is also based on a time or distance for potential routes from the start location to the end location or portions thereof. The mapping module 106 then provides, here through the output structure 110, at least one route. Four routes are provided in this example, including a fastest route 114, a shortest route 116, and two low-load routes, often-traveled route 118 and low-stress route 120. The driver may quickly select one of these routes, as a driver may be in a hurry and select the fastest route 114, stressed, and thus the low-stress route 120, or in a typical mood, tired, or preoccupied (e.g., with kids in the car), the often-traveled route 118, as it requires very little mental effort from the driver.

Figure 2:
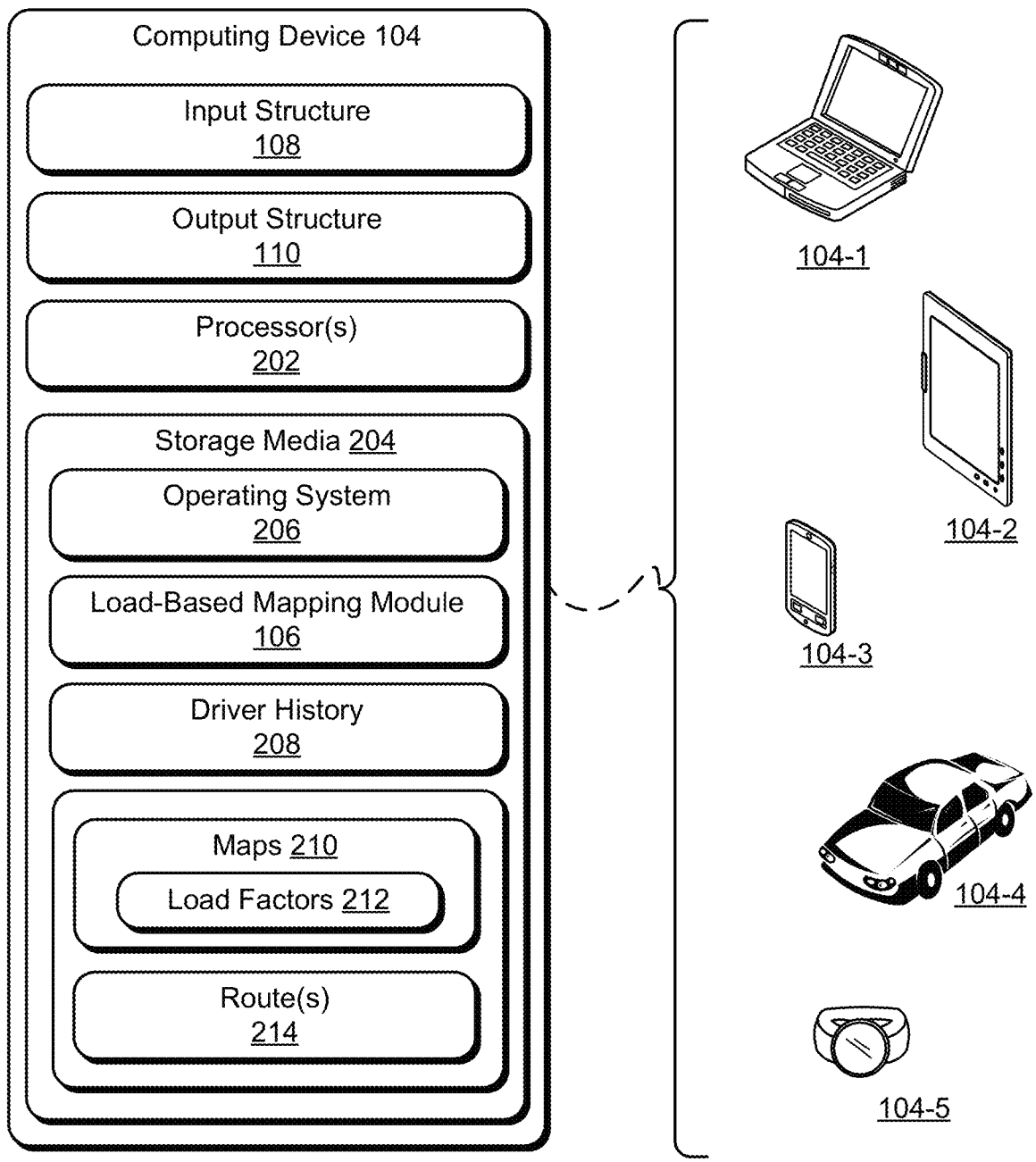
FIG. 2 illustrates the computing device of FIG. 1 in greater detail.

As shown in FIG. 2, the computing device 104 can be one or a combination of various devices, here illustrated with five examples: a laptop computer 104-1, a tablet computer 104-2, a smart phone 104-3, an automobile navigation system 104-4, and a computing watch 104-5, though other computing devices and systems, such as small wearable devices may also be used. The computing device 104 includes the input structure 108, the output structure 110 (both of which can be integral or disparate but in communication with computing device 104), one or more computer processors 202, and one or more computer-readable storage media 204. The storage media 104 includes an operating system 206, the load-based mapping module 106 of FIG. 1, a driver history 208, maps 210, load factors 212, and one or more routes 214.

The driver history 208 includes information about the user or driver requesting the route. This may include past routes or portions of routes driven, how often, how they were received by the driver (e.g., did the driver complain to their device or other passengers? Did the driver take the route once and avoid it in future? Does the driver take a particular route portion often even when faster or shorter options are available?). The driver history 208 may also include information about a driver's explicit selections, such as selecting that he or she enjoyed or did not enjoy a route, or thought the route was fast or slow (these are how a driver feels, not the actual time, with the drivers feeling of speed indicating a lower load to the driver). The driver may even select a preference for nature, for safety, feeling uncomfortable with higher speeds, narrower lanes, undivided highways, other driver's ability to pull right out into traffic without on-ramps or transition zones, and so forth. Other information can be more-passively collected, such as sounds or music played indicating children in the car, or the type of location indicating children are likely to be in the car (e.g., a foam dart or laser tag arena, trampoline gym, children's theater, school, etc.). Having children in a car often indicates a greater preference for safety by drivers, and a lower ability to handle stress or cognitive load.

The maps 210 are various maps or portions thereof, which can be those present in the current state of the art, but with non-conventional additions and annotations for load associated with particular portions. This can be useful for the mapping module 106 to quickly assess load for multiple routes, even if those routes were not provided by the mapping module 106.

The load factors 212 can include many types of loads, examples of which are set forth below. As noted in part above, cognitive, emotional, or psychological load for driving routes affects how the route is perceived and the actual non-resource or time costs to a driver or passengers—not just the time spent.

These loads include various load factors, including:

Road surroundings, such as narrowness, how close objects are to the road—does it hug houses, trees, and businesses, or are they set back from the road. The narrower the gap from the road the other objects, the higher the load for the route. This, along with long-distance views, can affect drivers, especially those having any claustrophobia feelings. Many people, even those without a diagnosed condition like claustrophobia, have lower psychological load to open spaces and large gaps from road to objects, than the opposite.

Lane number, such as one, two, or three lanes. In some cases two lanes is the lowest load, as three can induce stress from having to pay attention to more cars in more areas. One lane, in some cases, has a higher load than two, depending on how often a driver may get behind another car and not be able to pass. Roads that are one lane may have a lowest load, however, if there are occasional passing lanes.

Nature on the route, the greater the amount of nature, the lower the load, unless the amount of nature induces stress due to too much visually happening, though this is unlikely in most routes.

Aesthetics, such as industry on the route, and the beauty of that industry. Is it two-story shops or 10-story smelting furnaces? Larger, louder, and uglier buildings and industry induce higher amounts of load.

Types of vehicles typically on the route. Higher load is caused by large vehicles, such as semi-tractor trailers, as well as vehicles carrying an exposed load, as that induces stress if a driver may be concerned about items in an exposed load falling off the vehicle.

Perceived Danger. If a driver perceives danger, whether or not it exists, the load is higher for the route—this includes routes with large or loaded vehicles as noted above, vehicles being able to join the road without a gradual entry (such as cars stopped at roads or parking lots perpendicular to the route road, and from which they can jump in). Other perceived dangers includes wild animals on route (e.g., signs that say "watch for deer."), falling rock possibilities or signs indicating the same, lack of a shoulder or safe spot to drive off the road if a danger exists, and so forth.

Prior-driven route or route portion. The cognitive load on driving a new route is higher than a route a driver has driven before, especially if the driver has driven the route or portion thereof many times before. Thus, the techniques may even pull two commonly-driver routes together to lower the cognitive load for the driver, thereby proactively determining a route that may be a best route for the driver, or at least has a low cognitive load due to most of it being driven, even if in portions, previously.

Route-Based Disturbances. These include anything that requires the driver to change what they are doing, but each can be weighted different. Thus, a mild turn on a same road is weighted low, but has some load to it. A stop and then 90 degree turn has a much higher load. Stop-and-go traffic has a high load. Stopping at a light has a load, even in additional to the time it takes, as it irritates many drivers. Each turn has a load, as does each instruction that has to be given, even if it is to continue on the current road. This is an interruption, as they all are, and thus each has a load.

In addition to these factors, information about the driver and passengers can affect the route selected. A driver may indicate that he or she does not have passengers, and thus the techniques may down-weight perceived danger. Or a driver may have recorded preferences indicating that nature and space around the road are important, or this may be determined based on prior indications by the driver of what he or she felt about the route—did they like the route, did they feel it was safe or peaceful, and the like. These, over time, can indicate differences between drivers, and therefore the route selected or prepared for the driver.

Ways in which elements example operating environment 100 act and interact, as well as entities of FIGS. 1 and 2, are set forth in greater detail below. The entities are examples only, other entities may be involved and other arrangements, such as a wearable device communicating with a server or an automobile navigation system, may instead be used.

Methods for Load-Based Mapping

This disclosure describes techniques for load-based mapping. These techniques enable low-load or lower-load routes, which can reduce driver fatigue, increase enjoyment, or even improve a driver's safety. These techniques include various methods illustrated below, which may be used separately or in combination, in whole or in part. Aspects of these methods may be implemented in hardware, firmware, software, or a combination thereof. The methods are shown as a set of acts that specify operations performed by one or more entities and are not necessarily limited to the order shown.

Figure 3:
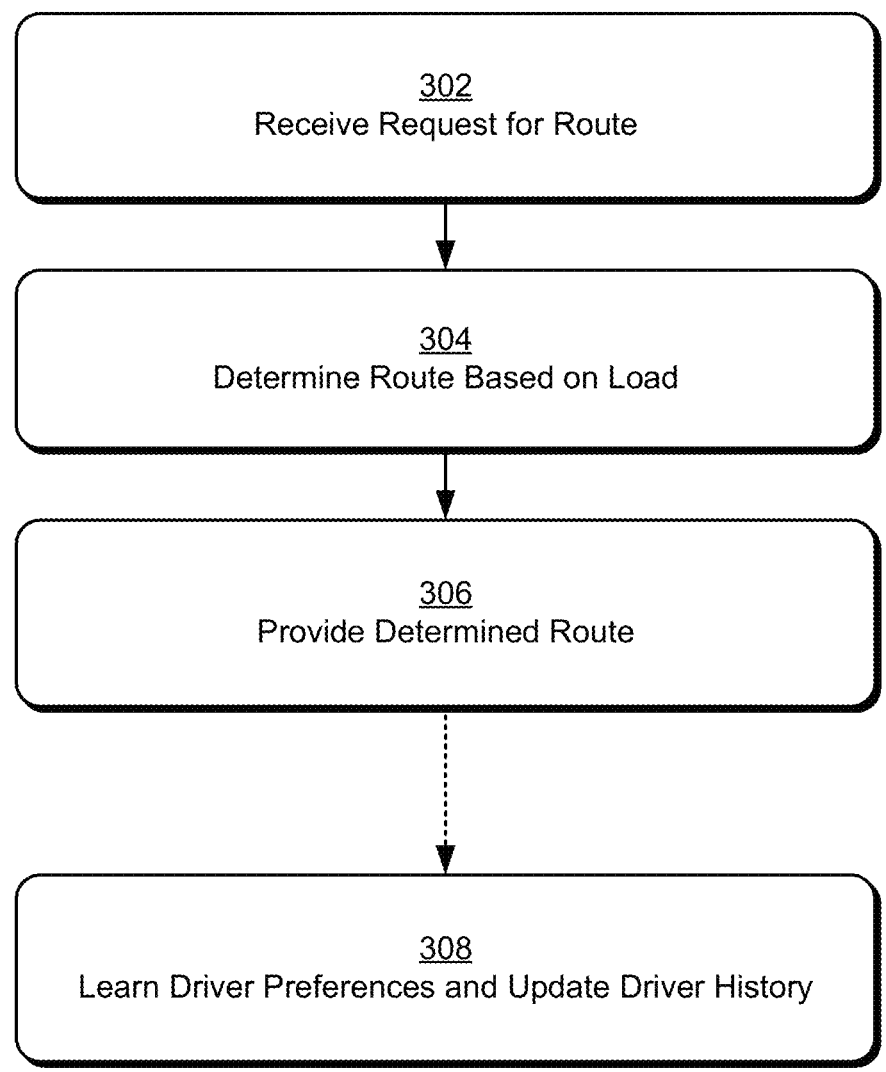
FIG. 3 illustrates example methods for load-based mapping.

FIG. 3 illustrates methods 300 for load-based mapping. At 302, a request for a route is received. This route can be from a start location to an end location, or a portion thereof, and can be from a driver's current location or some future location. By way of example, consider again the example illustrated in FIG. 1. As shown, the driver requested directions to a construction store through speech, which was recognized and sent to the mapping module 106.

At 304, a route is determined, based on one or more factors affecting a cognitive, emotional, or psychological load, and optionally a time or distance for potential routes from start location to the end location. Continuing the above example, the mapping module 106 determines four routes or determines, based on provided routes, those having a lower load for the driver.

In more detail, the mapping module uses factors, such as the load factors 212 of FIG. 2, to determine a low-load route or pick a low or lowest-load route provided by some other entity, such as convention mapping services that provide multiple routes from point A to point B.

In some cases, the mapping module 106 determines a route through determining a change to a portion of an existing route, such as one provided from another entity. This change to the portion altering the existing route based on the one or more factors, such as taking a provided fastest route, and determining that from mile 1.3 to 1.7, there is a low-load alternative, such as driving through farmland instead of a busy road, that reduces the load while costing only 30 seconds. In such a case, the mapping module 106 may provide this new route or suggest the alteration.

Furthermore, the mapping module 106 can determine that a prior route driven multiple times by the driver advances the driver from the first location to the second location. Assume, for example, that the mapping module 106 determines that a driver often drives his children to school. While there is a faster alternative, the desired location can be reached by first driving to the school and then another 7 minutes along a route not commonly driven by the driver. The alternative, however, is a 23-minute drive, all of which is rarely driven, rather than 17 minutes of known and 7 more of unknown. This 24-minute drive, because of the 17 minutes being well known, has a low mental load on the driver even though it increases the time by one minute. For example, many people feel like a drive that is a new, unknown route, takes longer than the return home. Why is this? Because the person has driven it zero times on the way out, and once on the way back. Even this one drive makes a difference, as most people feel it is faster on the drive back. The actual time and distance can be identical, but the drive feels faster, as the cognitive load of a complete unknown is much higher than even a lightly-known route. This mental load is a real cost for people, as it can increase stress, tire a person's mind (and reduce safety), and simply be less enjoyable.

At 306, the determined route is provided. The route can be provided to a driver of the route, an entity that requested the route, and so forth. Further, the route can be provided in whole or in part. In some cases, a portion of the route is given, such as an audio instruction indicating a change to an existing route, such as "turn right at Wilson Street for a pleasant natural drive, adding only 40 seconds to your trip". Or a route can be provided in full, such as in a text-based interface or step-by-step audio.

In still other cases, a determined route indicates directions to the beginning of the prior route or from the end of the prior route to the second location. In such a case, a route can be provided in prior-driven parts. The mapping module 106 may provide an instruction of "Proceed to John's School, from there you have only 7 more minutes to go", which is commonly driven by the driver. When the driver is near John's School (the end of the prior-driven route), the mapping module 106 can output other instructions, either to proceed along another well-known route for the driver or step-by-step instructions. By so doing, audio instructions can be ceased during the well-known portions, which reduces the irritation caused by navigation audio, further reducing the load for the drive.

Optionally at 308, the driver's preferences are learned, and the driver history is updated. This can be explicit through selection of the driver, or based on the driver refusing a suggestion that has a lower load, or selecting a route having various characteristics, such as a more-natural route over a route having a higher perceived safety.

As noted in part above, determining a route may involve receiving multiple potential routes or portions of routes and determining, based on the factors and the time or distance, which is the best route. Thus, the mapping module 106 may work with other applications that provide conventional routes.

Figure 4:
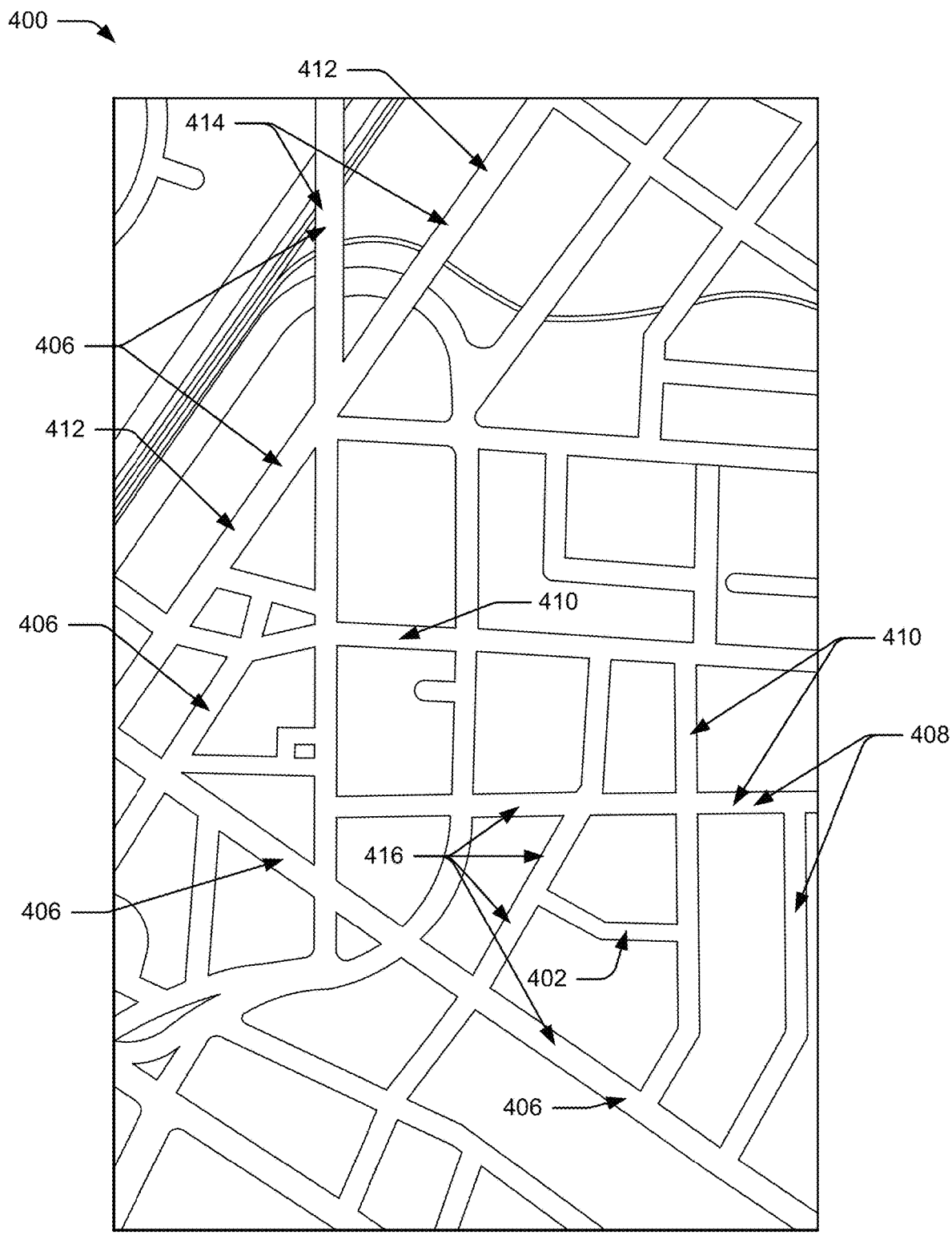
FIG. 4 illustrates an example map having load annotations.

Consider, by way of further example, FIG. 4, which illustrates a map 400 having annotations for portions of the map and their associated factors. In this example, particular factors are marked, which have associated loads, though these loads can vary in importance generally, and for particular persons. In detail, see narrow road 402, large lane number 404, small lane number 406 (here only marked as a load for higher-speed regions), nature 408, aesthetics 410, types of vehicles 412 (here large semitrailers), perceived danger 414, and prior-driven portion 416. Note that but a few of the many factors are shown here for visual brevity, each turn has a load, as does each light, the wait at those lights, the angle of the turn, and so forth.

Each of these can be weighed against each other and the time and/or distance as noted above. Time and distance can also be calculated as loads rather than independently, and thus only factors and their loads are used to decide a best route. Adding 3% to the time it takes to drive somewhere is an increase in the load, but that increase is often small relative other loads, such as nature, aesthetics, and prior-driven portions. Adding 30% to the time or distance, however, is a large increase in load except for very short trips, and thus the mapping module 106 selects against this increase to pick the shorter route in time or distance.

Note that one or more of the entities shown in FIGS. 1 and 2, such as the mapping module 106, may be further divided, combined, and so on. Each of these entities can be hardware, software, firmware, or a combination thereof, and/or stored on computer-readable storage media (as shown) and executed by one or more processors. This computer-readable storage media may include, by way of example and not limitation, memory devices with persistent and/or non-transitory data storage, RAM, ROM, flash, and disk storage devices (e.g., magnetic and optical hard disk drives or compact disc or digital versatile disk (DVD)). The computing device 104 can be one or a combination of a wired and/or a wireless device, including those noted above as well as a peripheral, a server device, and similar computing devices.

Although the subject matter has been described in language specific to structural features and/or methodological techniques and/or acts, it is to be understood that the subject matter defined in the appended claims is not necessarily limited to the specific features, techniques, or acts described above, including orders in which they are performed.

What is claimed is:

1. One or more non-transitory computer-readable storage media having instructions stored thereon that, responsive to execution by one or more processors, cause the one or more processors to perform operations comprising:
   determining, based on one or more factors affecting a cognitive, emotional, or psychological load for potential routes from a start location to an end location, a determined route for at least a portion of a route from the start location to the end location, the one or more factors affecting the cognitive, emotional, or psychological load including road surroundings for a portion of at least one of the potential routes, lane number for a portion of at least one of the potential routes, an amount of nature on a portion of at least one of the potential routes, types of vehicles present or likely to be present on a portion of at least one of the potential routes, perceived danger of a portion of at least one of the potential routes, a prior-driven route portion driven by the driver for at least a portion of one of the potential routes, aesthetics of a portion of at least one of the potential routes, or a route-based disturbance of a portion of at least one of the potential routes, the one or more factors including at least the prior-driven route portion driven by the driver for a least a portion of one of the potential routes,
   wherein the determined route includes the at least one prior-driven route portion driven by the driver, the prior-driven route portion having a first location and a second location, the first location at or after the start location of the determined route and the second location at or before the end location of the determine route; and
   providing the determined route to the driver, an entity from which a request to determine the route was received, or an automobile navigation system.

2. The non-transitory computer-readable storage media of claim 1, wherein determining the determined route further comprises receiving multiple potential routes and the determining selects the determined route from the received multiple potential routes based on the factors.

3. The non-transitory computer-readable storage media of claim 1, wherein the determining the determined route determines a change to a portion of an existing route, the existing route determined based on a time or distance, the change to the portion altering the existing route based on the one or more factors.

4. The non-transitory computer-readable storage media of claim 3, wherein the altering the existing route ceases audio for step-by-step instructions for at least a portion of the prior-driven route portion.

5. The non-transitory computer-readable storage media of claim 1, wherein using the prior-driven route portion increases a total time for the route compared to a fastest route from the start location to the end location.

6. The non-transitory computer-readable storage media of claim 1, wherein providing the determined route includes providing an instruction indicating to proceed to a name for the second location or the prior-driven route portion, the providing reducing an amount of instructions of step-by-step instructions to proceed from the start location to the end location.

7. The non-transitory computer-readable storage media of claim 6, wherein reducing the amount of instructions avoids at least one instruction of the step-by-step instructions to proceed from the first location to the second location, the avoided at least one instruction including an instruction to turn from one street to another street or change lanes.

8. The non-transitory computer-readable storage media of claim 1, wherein providing the determined route with the prior-driven route portion ceases audio instructions during at least a portion of the prior-driven route portion.

9. The non-transitory computer-readable storage media of claim 1, wherein providing the determined route includes step-by-step instructions from the second location of the prior-driven location to the end location.

10. The non-transitory computer-readable storage media of claim 1, wherein providing the determined route includes a single instruction to proceed to the second location, the single instruction not including step-by-step instructions from the first location to the second location.

11. The non-transitory computer-readable storage media of claim 1, wherein providing the determined route provides the determined route in prior-driven portions, the prior-driven portions including at least the prior-driven route portion and an additional prior-driven route portion.

12. The non-transitory computer-readable storage media of claim 1, wherein determining the determined route from the start location to the end location further comprises the determined route including a second prior-driven route portion previously driven by the driver, the prior-driven route portion having a third location after the second location and at or before the end location.

13. The non-transitory computer-readable storage media of claim 12, wherein providing the determined route includes providing instructions indicating to proceed to the third location, the instructions to the third location indicating a name for the third location and effective to avoid at least one step of step-by-step instructions to proceed from the second location to the third location.

14. The non-transitory computer-readable storage media of claim 1, wherein the one or more factors further include at least the road surroundings for a portion of at least one of the potential routes, and wherein the road surroundings for the portion of the at least one of the potential routes is determined to have a low cognitive, emotional, or psychological load based on the road surroundings for the portion having open spaces and large gaps from a road of the portion to objects, and wherein the determined route includes the portion determined to have the low cognitive, emotional, or psychological load.

15. The non-transitory computer-readable storage media of claim 1, wherein the one or more factors further include at least the lane number for a portion of at least one of the potential routes, and wherein the lane number for the portion of the at least one of the potential routes is determined to have a low cognitive, emotional, or psychological load based on the lane number being two lanes, and wherein the determined route includes the portion determined to have the low cognitive, emotional, or psychological load.

16. The non-transitory computer-readable storage media of claim 1, wherein the one or more factors further include at least the types of vehicles on or likely to be on a portion of at least one of the potential routes, and wherein the types of vehicles for the portion of the at least one of the potential routes is determined to have a high cognitive, emotional, or psychological load based on the types of vehicles including semi-tractor trailers, and wherein the determined route does not include the portion determined to have the high cognitive, emotional, or psychological load.

17. The non-transitory computer-readable storage media of claim 1, wherein the one or more factors further include at least the perceived danger for a portion of at least one of the potential routes, and wherein the perceived danger for the portion of the at least one of the potential routes is determined to have a high cognitive, emotional, or psychological load based on the perceived danger including a lack of shoulder or lack of gradual entry, and wherein the determined route does not include the portion determined to have the high cognitive, emotional, or psychological load.

18. The non-transitory computer-readable storage media of claim 1, wherein the providing the determined route is provided to the driver and the providing is through an audio or visual output structure of a computing device.

19. The non-transitory computer-readable storage media of claim 1, wherein the providing the determined route is provided to the automobile navigation system, and wherein the automobile navigation system includes an audio or visual output structure and through which instructions to perform the determined route are to be presented to the driver.

20. The non-transitory computer-readable storage media of claim 19, wherein the providing the determined route to the automobile navigation system is provided from a smartphone or wearable computing device associated with the one or more processors.

21. The non-transitory computer-readable storage media of claim 1, wherein the providing the determine route is provided to the entity from which the request to determine the route was received, the entity being a smartphone or wearable computing device, the smartphone or wearable computing device including an audio or visual output structure integral with the smartphone or wearable computing device and through which instructions to perform the determined route are to be presented to the driver.

22. The non-transitory computer-readable storage media of claim 1, further comprising receiving the request, from the driver, for a route to the end location and wherein the start location is determined based on a current location of a computing device at which the request is received.

23. The non-transitory computer-readable storage media of claim 1, wherein the time or distance is one of the one or more factors affecting the cognitive, emotional, or psychological load.

24. The non-transitory computer-readable storage media of claim 1, wherein providing the determined route includes providing instructions indicating to proceed to a name for the prior-driven route portion or the second location, the providing effective to avoid at least one step of step-by-step instructions to proceed from the first location to the second location and wherein the one or more factors further include at least the road surroundings for a portion of at least one of the potential routes, and wherein the road surroundings for the portion of the at least one of the potential routes is determined to have a low cognitive, emotional, or psychological load based on the road surroundings for the portion having open spaces and large gaps from a road of the portion to objects, and wherein the determined route includes the portion determined to have the low cognitive, emotional, or psychological load.

25. The non-transitory computer-readable storage media of claim 1, wherein providing the determined route includes providing instructions indicating to proceed to a name for the prior-driven route portion or for the second location, the providing effective to avoid at least one step of step-by-step instructions to proceed from the first location to the second location and wherein the one or more factors further include at least the lane number for a portion of at least one of the potential routes, and wherein the lane number for the portion of the at least one of the potential routes is determined to have a low cognitive, emotional, or psychological load based on the lane number being two lanes, and wherein the determined route includes the portion determined to have the low cognitive, emotional, or psychological load.

26. The non-transitory computer-readable storage media of claim 1, wherein providing the determined route includes providing instructions indicating to proceed to a name for the prior-driven route portion or for the second location, the providing effective to avoid at least one step of step-by-step instructions to proceed from the first location to the second location and wherein the one or more factors further include at least the types of vehicles on or likely to be on a portion of at least one of the potential routes, and wherein the types of vehicles for the portion of the at least one of the potential routes is determined to have a high cognitive, emotional, or psychological load based on the types of vehicles including semi-tractor trailers, and wherein the determined route does not include the portion determined to have the high cognitive, emotional, or psychological load.

27. The non-transitory computer-readable storage media of claim 1, wherein providing the determined route includes providing instructions indicating to proceed to a name for the prior-driven route portion or for the second location, the providing effective to avoid at least one step of step-by-step instructions to proceed from the first location to the second location and wherein the one or more factors further include at least the perceived danger for a portion of at least one of the potential routes, and wherein the perceived danger for the portion of the at least one of the potential routes is determined to have a high cognitive, emotional, or psychological load based on the perceived danger including a lack of shoulder or lack of gradual entry, and wherein the determined route does not include the portion determined to have the high cognitive, emotional, or psychological load.

28. The non-transitory computer-readable storage media of claim 1, wherein the determining the determined route is based on a driver history indicating, for at least a recorded portion of one or more of the potential routes, a load or preference for the recorded portion.

29. The non-transitory computer-readable storage media of claim 28, wherein the load or preference for the recorded portion includes a number of times that the driver has driven the recorded portion, the number of times inversely associated with the load for the recorded portion.

30. The non-transitory computer-readable storage media of claim 28, wherein the load or preference for the recorded portion includes an explicit selection by the driver of the preference for or against the recorded portion.

31. The non-transitory computer-readable storage media of claim 28, wherein the driver history is determined, prior to the determining the determined route, based on annotations to a map, the annotations indicating a preference affecting the load for a portion of the map.

32. The non-transitory computer-readable storage media of claim 1, wherein the determining the determined route is based on a driver history indicating a preference for road surroundings, lane number, amount of nature, types of vehicles present, perceived danger, a prior-driven route portion, or aesthetics.

33. The non-transitory computer-readable storage media of claim 32, further comprising weighting the one or more factors based on the driver history, the weighting used as part of determining the determined route.

34. The non-transitory computer-readable storage media of claim 1, wherein determining the determined route based on the one or more factors weights the factors based on a current condition of the driver or of a vehicle in which the driver resides or is associated.

35. The non-transitory computer-readable storage media of claim 34, wherein the current condition is children in the vehicle, the current condition increasing a weight of the cognitive, emotional, or psychological load for the perceived danger of the portion of the at least one of the potential routes.

36. The non-transitory computer-readable storage media of claim 34, wherein the current condition is the driver being in a hurry, the current condition decreasing a weight of the cognitive, emotional, or psychological load for the potential routes.

37. The non-transitory computer-readable storage media of claim 1, further comprising annotating a map useable to perform the determination of the route, the annotating including an indication of a load for a portion of the map.

38. The non-transitory computer-readable storage media of claim 1, further comprising also providing a second determined route, the second determined route being a faster or shorter route than the determined route, and, responsive to a selection by the driver of the determined route, providing the selected, determined route to the driver through an audio or visual structure.

39. The non-transitory computer-readable storage media of claim 38, wherein the providing the second determined route indicates that the second determined route is faster or shorter than the determined route and information about a load of the determined route.

40. The non-transitory computer-readable storage media of claim 39, wherein the providing also indicates an amount of time or distance between the determined route and the second determined route.

41. The non-transitory computer-readable storage media of claim 1, wherein providing the determined route indicates a type of load of the determined route or a portion of the determined route, the type of load indicating a lower cognitive, emotional, or psychological load based on the road surroundings, lane number, amount of nature, types of vehicles present or likely to be present, perceived danger, prior-driven route portion driven by the driver, or aesthetics for the determined route or the portion of the determined route.

42. The non-transitory computer-readable storage media of claim 1, wherein the providing the determined route provides a portion of the route, the portion determined to have a low cognitive, emotional, or psychological load.

43. The non-transitory computer-readable storage media of claim 42, wherein the providing the portion of the route causes an audio or visual structure to provide an indication of the portion and information about a load of the portion of the route.

44. The non-transitory computer-readable storage media of claim 42, wherein the providing the portion of the route indicates a change to an existing route, the change adding time or distance to the existing route and reducing the cognitive, emotional, or psychological load of the existing route.

45. The non-transitory computer-readable storage media of claim 1, wherein determining the determined route based on the one or more factors includes a factor for a number of turns.

46. The non-transitory computer-readable storage media of claim 1, wherein the determining the potential routes from the start location to the end location is further based on a time or distance for each of the potential routes or route portions.

47. The non-transitory computer-readable storage media of claim 1, wherein the determining the potential routes from the start location to the end location includes determining all of the route from the start location to the end location and the providing the determine route provides all of the determined route.

48. The non-transitory computer-readable storage media of claim 1, wherein determining the determined route based on the one or more factors includes a factor for a number of stop lights.

49. The non-transitory computer-readable storage media of claim 1, wherein the prior-driven route portion has been driven by the driver multiple times.

50. The non-transitory computer-readable storage media of claim 1, wherein determining the determined route based on the one or more factors includes a factor for an angle of a turn, a mild angle having a lower load than a 90-degree angle.

* * * * *